United States Patent
Ramalho

(10) Patent No.: US 7,852,999 B2
(45) Date of Patent: Dec. 14, 2010

(54) CLASSIFYING SIGNALS AT A CONFERENCE BRIDGE

(75) Inventor: Michael A. Ramalho, Sarasota, FL (US)

(73) Assignee: Cisco Technology, Inc., San Jose, CA (US)

(*) Notice: Subject to any disclaimer, the term of this patent is extended or adjusted under 35 U.S.C. 154(b) by 1631 days.

(21) Appl. No.: 11/117,583

(22) Filed: Apr. 27, 2005

(65) Prior Publication Data

US 2006/0245565 A1    Nov. 2, 2006

(51) Int. Cl.
   *H04M 3/42* (2006.01)
(52) U.S. Cl. .................. 379/202.01; 370/289
(58) Field of Classification Search ..........................
   379/202.01–206.01, 406.06–406.07, 406.01;
   370/286–292, 416–417
   See application file for complete search history.

(56) References Cited

U.S. PATENT DOCUMENTS

| | | | | |
|---|---|---|---|---|
| 3,684,829 | A | * | 8/1972 | Patterson ................. 341/138 |
| 3,786,188 | A | * | 1/1974 | Allen ........................ 704/263 |
| 4,199,261 | A | * | 4/1980 | Tidd et al. ................. 356/448 |
| 4,815,068 | A | * | 3/1989 | Dolby et al. ................ 369/88 |
| 4,815,132 | A | * | 3/1989 | Minami ......................... 381/1 |
| 5,732,306 | A | * | 3/1998 | Wilczak, Jr. ................... 399/9 |
| 5,864,583 | A | * | 1/1999 | Ozkan ....................... 375/242 |
| 6,049,765 | A | * | 4/2000 | Iyengar et al. .............. 704/201 |
| 6,385,548 | B2 | * | 5/2002 | Ananthaiyer et al. ......... 702/73 |
| 6,453,022 | B1 | * | 9/2002 | Weinman, Jr. ........... 379/88.13 |
| 6,477,502 | B1 | * | 11/2002 | Ananthpadmanabhan et al. .......................... 704/503 |
| 6,675,144 | B1 | * | 1/2004 | Tucker et al. ............... 704/264 |
| 6,785,645 | B2 | * | 8/2004 | Khalil et al. ................ 704/216 |
| 6,823,303 | B1 | | 11/2004 | Su et al. ..................... 704/220 |
| 6,839,416 | B1 | * | 1/2005 | Shaffer ................... 379/202.01 |
| 6,842,731 | B2 | | 1/2005 | Miseki ....................... 704/217 |
| 7,130,796 | B2 | * | 10/2006 | Tasaki ........................ 704/223 |
| 7,136,471 | B2 | * | 11/2006 | Johnson ...................... 379/189 |
| 7,266,113 | B2 | * | 9/2007 | Wyatt ......................... 370/352 |
| 7,369,652 | B1 | * | 5/2008 | Liang et al. ............ 379/202.01 |
| 7,392,189 | B2 | * | 6/2008 | Hennecke et al. ........... 704/254 |
| 2002/0126165 | A1 | * | 9/2002 | Adkins et al. ................. 347/9 |
| 2003/0025832 | A1 | * | 2/2003 | Swart et al. ................ 348/461 |
| 2004/0076271 | A1 | * | 4/2004 | Koistinen et al. ........ 379/88.11 |
| 2004/0125001 | A1 | * | 7/2004 | Lotzer ......................... 341/50 |
| 2004/0138876 | A1 | * | 7/2004 | Kallio et al. ................ 704/209 |

OTHER PUBLICATIONS

"Linear Prediction Coding LPC," http://www.mor.itesm.mx/~omayora/Tutorial/node14.html, 4 pgs, Mar. 4, 2005.

"Introduction to CELP Coding," http://www.speex.org/manual/node8.html, 6 pgs, Mar. 4, 2005.

"Speech Compression," http://www.data-compression.com/speech.html, 13 pgs, Mar. 4, 2005.

(Continued)

*Primary Examiner*—Simon Sing
*Assistant Examiner*—Assad Mohammed
(74) *Attorney, Agent, or Firm*—Baker Botts L.L.P.

(57) ABSTRACT

Classifying signals includes receiving signals from communication devices, where each signal is received from a communication device. The following is repeated for each signal: a received signal from the communication device is encoded, whether the encoded signal is an undesirable auditory signal is determined, and the encoded signal is modified if the encoded signal comprises an undesirable auditory signal. The received signals are combined.

11 Claims, 2 Drawing Sheets

OTHER PUBLICATIONS

R. Dewan, "Selective Conversation Recording Using Speech Heuristics," U.S. Appl. No. 10/028,383, 22 pgs. with one sheet of formal drawings, Dec. 20, 2001.

W. W. Liang and C.F. Jennings, "Combining Signals at a Conference Bridge," U.S. Appl. No. 10/436,906, 25 pgs. with two sheets of formal drawings, May 13, 2003.

* cited by examiner

CLASSIFYING SIGNALS AT A CONFERENCE BRIDGE

TECHNICAL FIELD OF THE INVENTION

This invention relates generally to the field of telecommunications and more specifically to classifying signals at a conference bridge.

BACKGROUND OF THE INVENTION

Modern business practices often require that several persons engage in a conference call instead of physically meeting at the same location. The conference call has introduced certain convenient features. For example, a conference call participant who is not actively participating in the conference call may mute the audio output and simply listen to the call. This feature allows the participant to selectively participate in the conference call.

Conference calls, however, are prone to undesirable auditory signals. For example, a participant may unintentionally breathe heavily into the telephone or may fall asleep during a conference call and begin snoring. If the undesirable sounds are mixed with the desired components of the conference call, the undesirable sounds will likely distract or disrupt the conference call. As another example, a participant may place the other participants on hold during a conference call, which may cause music to play over the conference bridge.

The undesirable sounds may be reduced or eliminated using known techniques. According to one technique, a conference bridge operator may manually intervene to remove the undesirable sound. According to another technique, a participant causing the undesirable sound may be notified by another participant. These techniques, however, may disrupt the call on the conference bridge.

SUMMARY OF THE INVENTION

In accordance with the present invention, disadvantages and problems associated with previous techniques for classifying signals at a conference bridge may be reduced or eliminated.

According to one embodiment of the present invention, classifying signals includes receiving a plurality of signals from communication devices, where each signal is received from a communication device. The following is repeated for each signal: a received signal from the communication device is encoded, whether the encoded signal is an undesirable auditory signal is determined, and the encoded signal is modified if the encoded signal comprises an undesirable auditory signal. The received signals are combined.

Certain embodiments of the invention may provide one or more technical advantages. A technical advantage of one embodiment may be that signals are classified at the conference bridge. By classifying signals at the conference bridge, undesirable signals may be detected and modified to prevent interference with the conference call conducted on the conference bridge. Another technical advantage of an embodiment may be that undesirable signals are modified without user intervention. By automatically modifying undesirable signals, undesirable sounds may be reduced without interrupting the conference call.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawing, in which.

DETAILED DESCRIPTION OF THE INVENTION

Figure 1:
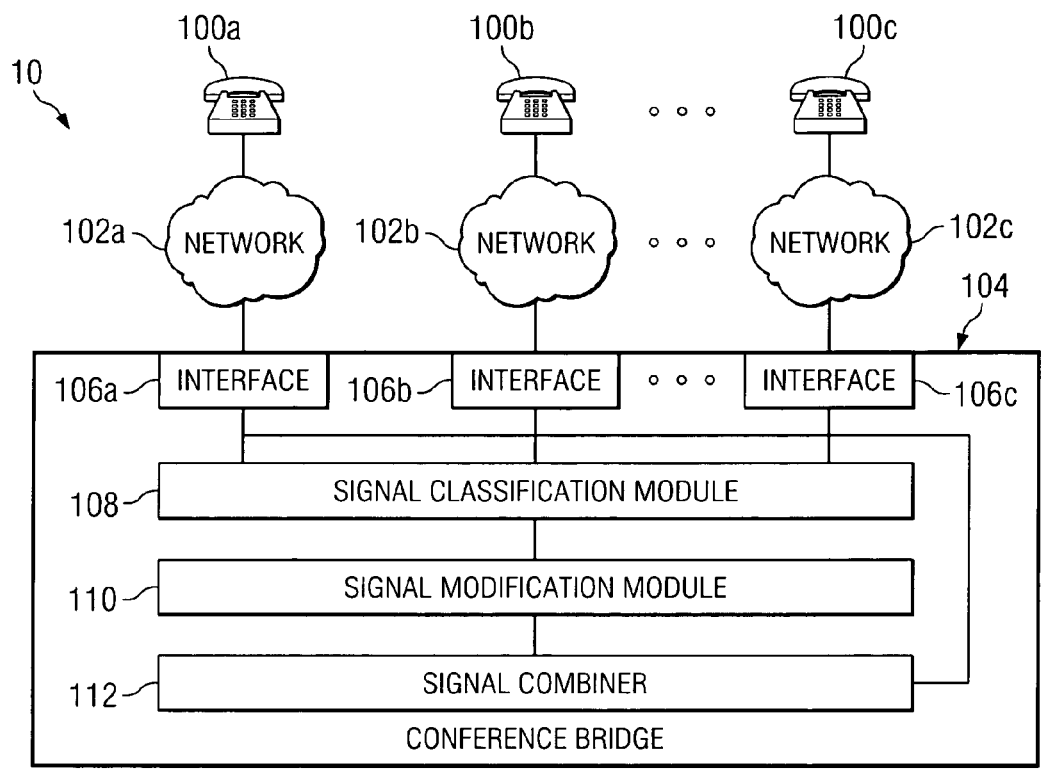
FIG. 1 is a block diagram of one embodiment of a system for classifying signals.
Figure 2:
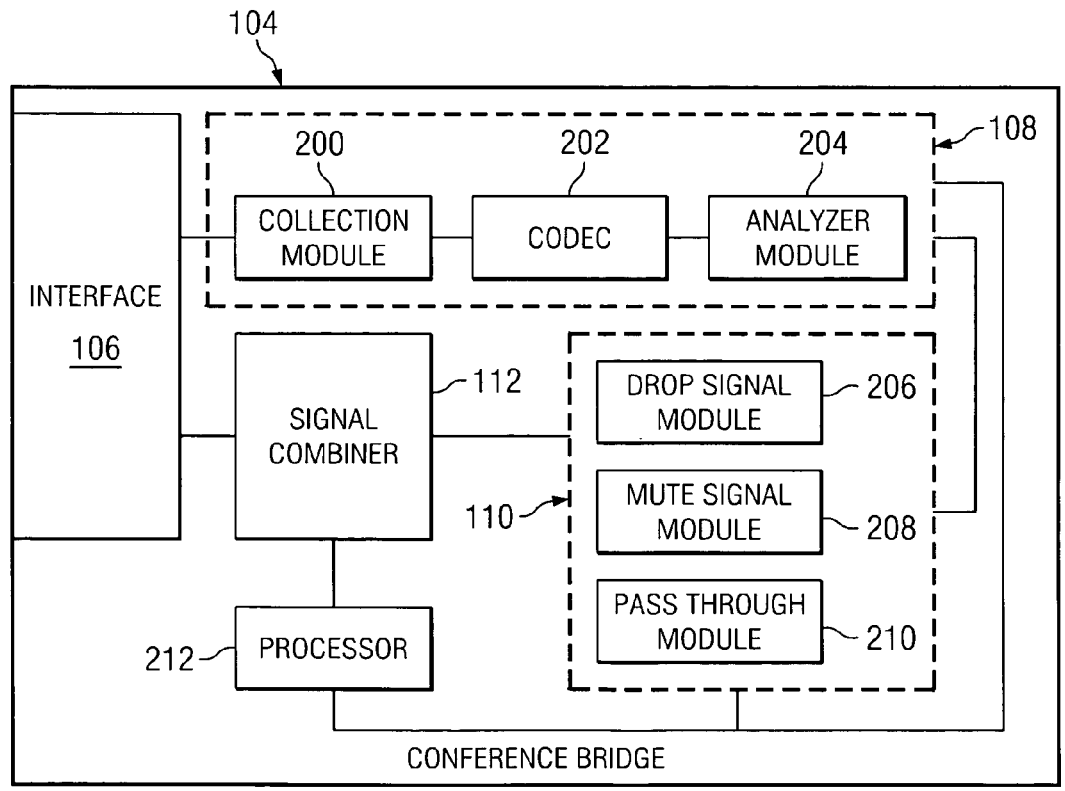
FIG. 2 is a block diagram of one embodiment of a conference bridge in the system for classifying signals.
Figure 3:
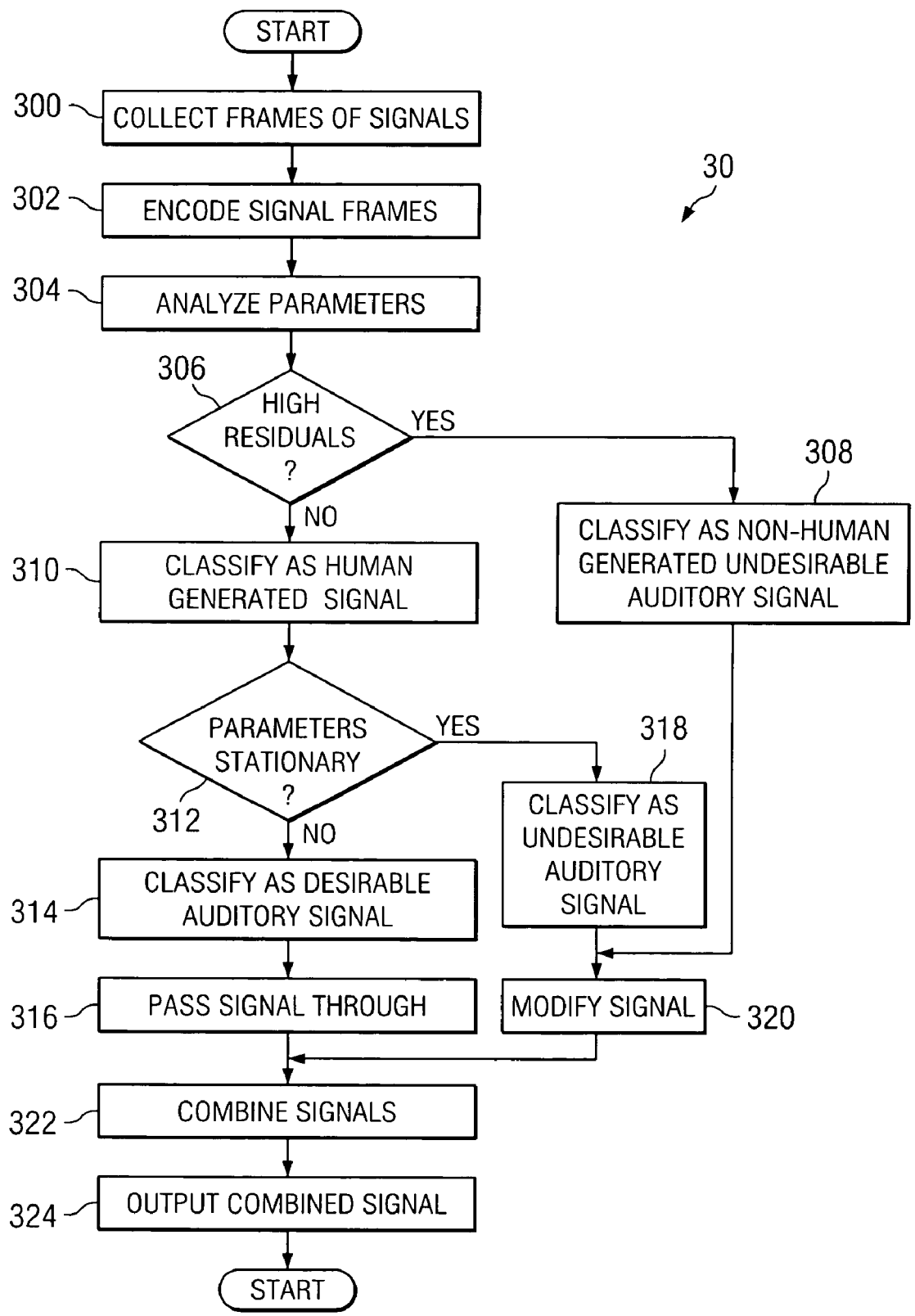
FIG. 3 is a flowchart illustrating one embodiment of a method for classifying signals.

Embodiments of the present invention and its advantages are best understood by referring to FIGS. 1 through 3 of the drawings, like numerals being used for like and corresponding parts of the various drawings.

FIG. 1 is a block diagram of a system 10 for classifying signals. System 10 includes a conference bridge that has a signal classification module. The signal classification module classifies signals received from multiple communication devices to determine the signal types of the signals. The conference bridge controls the conference call and allows modification of the signals in accordance with the classification of the signal.

According to the illustrated embodiment, system 10 includes communication devices 100a-c that communicate with a conference bridge 104 through communication networks 102a-c. Communication devices 100a-c may send and receive audio signals, video signals, or any combination of the preceding. The signals may communicate information, such as data, audio, video, multimedia, any other suitable type of information, or any combination of the preceding. In the illustrated embodiment, communication devices 100a-c communicate audio signals over to the conference bridge 104.

Communication devices 100a-c may include, for example, a telephone, a cellular telephone, a mobile handset, or any other device suitable for communicating signals to and from system 10. Communication devices 100a-c may support, for example, Internet Protocol (IP), mobile IP, or any other suitable communication protocol.

Communication network 102a-c allows communication devices 100a-c to communicate with other networks or devices. Communication network 102a-c may include a public switched telephone network (PSTN), a public or private data network, a local, regional, or global communication network, an enterprise intranet, other suitable communication link, or any combination of the preceding.

Conference bridge 104 facilitates conference calls or other suitable real-time multiparty communication sessions between communication devices 100a-c. The calls may communicate audio, video, or other suitable information. Conference bridge 104 classifies signals received from communication devices 100a-c, modifies the signals if desired, combines the signals, and sends the combined signals to communication devices 100a-c. Conference bridge 104 includes interfaces 106a-c, a signal classification module 108, a signal modification module 110, and a signal combiner 112 coupled as shown.

Interfaces 106a-c represent any port or connection, real or virtual, including any suitable hardware, software, or both that allow conference bridge 104 to exchange information with other components of system 10. In the illustrated embodiment, interfaces 106a-c operate as network interfaces that allow conference bridge 104 to receive and transmit information with networks 102a-c. Additionally, interfaces 106a-c may include a user interface that allows users to alter the behavior of conference bridge 104.

Signal classification module 108 classifies signals according to any suitable classification. For example, the classification may be used to determine whether to modify a signal to improve the quality of a conference call. In the illustrated embodiment, signal classification module 108 classifies signals into desirable auditory signals and undesirable auditory signals. Desirable auditory signals depict the information contained in spoken word as produced by humans. Undesirable auditory signals depict sounds not characterized as spoken word as produced by humans and non-humans. Examples of undesirable auditory signals may include heavy breathing, snoring, or music played when communication devices 100a-c are placed on hold. Signal classification module 108 further classifies the undesirable auditory signals into human generated signals and non-human generated signals. Human generated undesirable auditory signals may include snoring and heavy breathing. Non-human generated undesirable auditory signals may include music-on-hold.

Signal classification module 108 may perform classification of a signal in any suitable manner. For example, signal classification module 108 may apply a low bit rate speech model to the signal to encode the signal. The classification of the encoded signal as an undesirable auditory signal, a non-human generated signal, or a human generated signal depends on the design of signal classification module 108. For example, signal classification module 108 may classify the signals depending on whether the encoded signal exceeds a threshold.

Signal classification module 108 may perform classification at any suitable time or on any suitable signal. In one embodiment, signal classification module 108 continuously or periodically collects a sample of the signal to classify the signal. In another embodiment, signal classification module 108 may pre-screen the received signals to remove desirable auditory signals from the classification process and classify only undesirable signals.

Signal classification module 108 may be located at any part of system 10 where there is access to the signal. For example, signal classification module 108 may be located at communication devices 100a-c, at a gateway or node that communicates a signal between communication devices 100a-c and conference bridge 104, at conference bridge 104, or at any other point where signal classification module 108 has access to the signal.

Signal modification module 110 modifies a signal in accordance with how signal classification module 108 classifies the signal. Modifying the signal may include adjusting the signal, changing the signal, shifting the signal, maintaining the signal, or any suitable modification. For example, if signal classification module 108 classifies the signal as a desirable auditory signal, signal modification module 110 may maintain the signal, allowing the desirable auditory signal to pass through. If signal classification module 108 classifies the signal as an undesirable auditory signal, signal modification module 110 may adjust the signal's output level. Signal modification module 110 may modify human generated and non-human generated undesirable auditory signals.

Signal modification module 110 may modify an undesirable auditory signal in any suitable manner. For example, signal modification module 110 may attenuate or drop the signal. Dropping the signal involves disconnecting communication device 100a-c from conference bridge 104 and terminating signal exchange from communication device 100a-c that placed the signal on conference bridge 104. Attenuating the signal may involve reducing the signal's amplitude or muting the signal. Reducing the amplitude reduces the audio output level over the conference bridge. Muting the signal terminates the audio output from communication device 100a-c over conference bridge 104, but does not terminate the audio input to communication device 100a-c.

In one embodiment, signal modification module 110 modifies the undesirable auditory signal without user intervention. For example, upon classifying the signal as an undesirable auditory signal, signal modification module 110 may automatically modify the signal, such as muting the signal. In another embodiment, upon classification, a conference bridge operator may intervene and disconnect communication device 100a-c that placed the undesirable auditory signal on conference bridge 104. The operator may use a graphic user interface or any other suitable interface to modify the signal. In yet another embodiment, signal modification module 110 may transmit a warning message to communication device 100a-c producing the undesirable auditory signal. The warning message may notify communication device 100a-c to discontinue the undesirable auditory signal or the signal will be attenuated or terminated. The warning message may also indicate an estimated probability that a signal contains an undesirable sound and sends this to a user interface of a conference call operator so the conference call operator may take appropriate action. The warning message may also be displayed on user interfaces of any number of conference call participants.

As with signal classification module 108, signal modification module 110 may be located at any part of system 10 where there is access to the signal. For example, signal modification module 110 may be located at communication devices 100a-c, at a gateway or node that communicates a signal between communication devices 100a-c and conference bridge 104, at conference bridge 104, or at any other point where signal modification module 110 has access to the signal.

Signal combiner 112 combines the signals received from signal modification module 110. If signal modification module 110 drops an undesirable auditory signal, signal combiner 112 does not combine the dropped signal with the remaining signals. The combined signals are transmitted back to communication devices 100a-c.

In operation, communication devices 100a-c transmit signals over communication networks 102a-c to conference bridge 104. Conference bridge 104 receives the signals at interfaces 106a-c. From interfaces 106a-c, signal classification module 108 classifies the signals into human generated or non-human generated signals. Signal classification module 108 further classifies the human generated signals into undesirable auditory signals and desirable auditory signals. Such classification may be in the form of a likelihood or a probability that the signal contains an undesirable auditory signal. Automated heuristics may be applied if the likelihood is very high that the auditory signal is undesirable. If it is a borderline likelihood, an indication of the likelihood may be sent to the conference operator or other participants that can affect the signal. For example, a person breathing loudly into a conference bridge rarely notices their own breathing. An indication may be sent to the person's user interface that causes the person to independently take action, such as muting their own input. Signal modification module 110 receives the signals from signal classification module 108 and modifies the signals in accordance with the signal's classification. Signal combiner 112 combines the signals and transmits the signals back to communication devices 100a-c.

Modifications, additions, or omissions may be made to the system without departing from the scope of the invention. For example, signal classification module 108 may analyze only undesirable auditory signals, while desirable auditory signals may proceed directly to signal combiner 112 without passing through signal classification module 108 and signal modification module 110. Additionally, any suitable logic comprising software, hardware, other logic, or any suitable combination of the preceding may perform the functions of system 10. The logic may be embodied in a tangible medium.

FIG. 2 is a block diagram of a conference bridge 104 of system 10 for classifying signals. Conference bridge 104 includes an interface 106, a signal classification module 108, a signal modification module 110, a signal combiner 112, and a processor 212. Interface 106 allows conference bridge 104 to exchange information with other elements of system 10. Signal classification module 108 classifies a received signal, and signal modification module 110 modifies the signal depending on the classification. Signal combiner 112 combines the signals and transmits the combined signals to communication devices 100a-c. Processor 212 may refer to any suitable device operable to execute instructions and manipulate data to perform operations of conference bridge 104.

According to the illustrated embodiment, signal classification module 108 includes a collection module 200, a coder/decoder 202, and an analyzer module 204. Collection module 200 collects frames of a received signal for analysis and classification. A frame may refer to a portion of a continuous signal having a predetermined time interval. The frames may be collected over a predetermined period of time. For example, collection module 200 may collect frames of the received signal over a configured period of time for a plurality of periods. Collecting a plurality of frames of the received signal allows conference bridge 104 to analyze more frames, which may yield a more accurate classification of the signal. As another example, collection module 200 may collect the frames in response to an instruction from conference bridge 104 or communication devices 100a-c. The classification of the signal may be in the form of a probability or likelihood that a signal is undesirable.

Coder/decoder (codec) 202 converts audio, video, or other signals from an analog format or digital pulse code modulation (PCM) format to a digital representation based on a particular coding methodology. According to one embodiment, codec 202 extracts parameters from the signals using low-bit rate speech coding techniques. Such techniques may include G.723.1, G.727, or other suitable technique operable to code speech at a low-bit rate. The low-bit rate coding techniques use a speech production model to decompose the signal to yield the parameters. The techniques model the signal with parameters that represent the audio signal in a digital format, such as vocal tract parameters and excitation parameters. Vocal tract parameters correlate to the vocal tract and nasal cavity movement. Excitation parameters correlate to the excitation in the vocal tract, which includes the fundamental frequency produced by the vocal chords.

The low-bit rate coding techniques capture most of the signal energy of human generated signals. That is, the techniques model human generated signals well. However, the low-bit rate coding techniques typically fail to capture the signal energy of non-human generated signals well, leaving significant amounts of signal energy unmodeled. The unmodeled energy is the "residual." Accordingly, human generated signals have low residuals and non-human generated signals have high residuals.

Analyzer module 204 analyzes the parameters from the encoded signal. Analyzer module 204 determines whether the auditory signal is human generated or non-human generated, and further, whether the human generated signal represents a desirable auditory signal or an undesirable auditory signal. To determine whether the signal is human generated or non-human generated, analyzer module 204 considers the residual level of the signal. Non-human generated signals have high residuals over a period of time, whereas human generated signals have low residuals. Human generated signals vary with the phonemes spoken. For example, a "z" sound has lower energy than a vowel like an "ah" sound. The residual magnitudes are usually computed as a ratio of the total signal energy. Additionally, residuals are typically computed when the signal energy is significantly above the "noise floor," the lowest level of noise in a particular bandwidth.

In one embodiment, analyzing the parameters includes establishing thresholds that may be used to classify signals as human generated or non-human generated. According to this embodiment, analyzer module 204 establishes a residual threshold that sets the limit of residual a signal may have to be classified as a non-human generated signal. The residual threshold may set the upper limit of residual a signal may have to be human generated. In this embodiment, analyzer module 204 classifies any signal with residuals below the designated threshold as human generated and classifies signals with residuals above the designated threshold as non-human generated.

Analyzer module 204 further analyzes the parameters to determine whether the human generated signal is a desirable auditory signal or an undesirable auditory signal. To determine whether the signal is a desirable auditory signal, analyzer module 204 considers the vocal tract parameters. If the vocal tract parameters actively move, analyzer module 204 classifies the signal as a desirable auditory signal. But if the vocal tract parameters remain relatively stationary, analyzer module 204 classifies the signal as a human generated undesirable auditory signal.

In one embodiment, a parameter variation threshold may be established to classify a human generated signal as desirable or undesirable. The parameter variation threshold sets the limit of variation a human generated signal may have to be classified as an undesirable auditory signal. Signals with nominal parameter variations may be classified as human generated undesirable auditory signals, and signals with more significant parameter variations may be classified as desirable auditory signals. The parameter variation threshold may include more detailed thresholds that further classify the human generated undesirable auditory signal. For example, parameter variation within a certain amount may be characterized as snoring, whereas parameter variation within another amount may be characterized as heavy breathing.

Signal modifier 110 includes modules that modify the signal depending on how signal classifier 108 classifies the signal. In the illustrated embodiment, signal modifier 110 includes the following modules: a drop signal module 206, a mute signal module 208, and a pass through module 210. Drop signal module 206 terminates a received signal at conference bridge 104 to prevent communication devices 100a-c from receiving the signal. If signal classifier 108 classifies the signal as an undesirable auditory signal, whether human generated or non-human generated, conference bridge 104 has the option of completely dropping the signal.

Mute signal module 208 attenuates a signal received from a communication device 100a-c to prevent other communication devices 100a-c from receiving the signal, but allows communication devices 100a-c to receive the combined signal. Conference bridge 104 may send an undesirable auditory signal through mute signal module 208. Pass through module 210 allows a signal to pass through signal modifier 110 unchanged. A desirable auditory signal may be sent through pass through module 210.

Modifications, additions, or omissions may be made to conference bridge 104 without departing from the scope of the invention. For example, signal modifier 110 may be implemented as a digital mixer allowing the functions of drop signal module 206, mute signal module 208, and pass through module 210 to reside in a single module. Additionally, any suitable logic comprising software, hardware, other logic, or any suitable combination of the preceding may perform the functions of conference bridge 104.

FIG. 3 is a flowchart 30 illustrating one embodiment of a method for classifying a plurality of signals. The method begins at step 300 where conference bridge 104 collects signal frames from communication devices 100a-c. Codec 202 encodes the received frames at step 302. Encoding the signal provides parameters of the signal.

The parameters are analyzed at analyzer module 204 at step 304. Analyzer module 204 determines whether the signal has high residuals at decisional step 306 to determine whether the signal is a human generated signal or a non-human generated signal. If the signal has high residuals at decisional step 306, analyzer module 204 classifies the module as a non-human generated undesirable auditory signal at step 308. If the signal does not have high residuals, analyzer module 204 classifies the signal as human generated at step 310.

At decisional step 312, analyzer module 204 determines whether the parameters of the signal remain relatively stationary during high energy periods. If the parameters do not remain stationary but actively vary, analyzer module 204 classifies the signal as a desirable auditory signal at step 314. Signal modifier 110 passes the desirable auditory signal through without modification at step 316. If the parameters remain stationary, analyzer module 204 classifies the signal as an undesirable auditory signal at step 318.

Signal modifier 110 modifies the non-human generated and human generated undesirable auditory signals at step 320. Signal combiner 112 combines the signals that have not been dropped at step 322. Conference bridge 104 outputs the combined signal at step 324 to communication devices 100a-c. After outputting the combined signal, the method terminates.

Modifications, additions, or omissions may be made to the method without departing from the scope of the invention. For example, the classification of the signals may be time varying. The frames of signals may be collected over various periods of time and analyzed to determine a percentage or likelihood that a signal may be classified a particular way. As another example, the results of decisional steps 306 and 312 may be expressed as a likelihood that a signal is a non-human generated undesirable auditory signal, a human-generated undesirable auditory signal, or a human-generated desirable auditory signal. The likelihood of the classification may be presented to conference call participants, a conference call operator, or any other suitable person or device. Additionally, steps may be performed in any suitable order without departing from the scope of the invention.

Certain embodiments of the invention may provide one or more technical advantages. A technical advantage of one embodiment may be that signals are classified at the conference bridge. By classifying signals at the conference bridge, undesirable signals may be detected and modified to prevent interference with the conference call conducted on the conference bridge. Another technical advantage of an embodiment may be that undesirable signals are modified without user intervention. By automatically modifying undesirable signals, undesirable sounds may be reduced without interrupting the conference call.

Although an embodiment of the invention and its advantages are described in detail, a person skilled in the art could make various alterations, additions, and omissions without departing from the spirit and scope of the present invention as defined by the appended claims.

What is claimed is:

1. A method for classifying a plurality of signals, comprising:
   receiving a plurality of auditory signals from a plurality of communication devices, each signal received from a communication device;
   repeating the following for each signal of the plurality of signals to yield one or more classified signals:
      encoding an auditory signal received from the communication device using a processor;
      determining, using the processor, whether the encoded auditory signal comprises an undesirable auditory signal by:
         collecting one or more parameters from the encoded auditory signal over a predetermined period of time for a plurality of periods of time; and
         analyzing the one or more parameters over the predetermined periods of time to classify the encoded auditory signal as a selected one of a desirable auditory signal, a non-human generated undesirable auditory signal, and a human generated undesirable auditory signal, wherein analyzing the one or more parameters over the predetermined periods of time to classify the encoded auditory signal comprises:
            establishing a residual threshold and a parameter variation threshold to analyze the encoded auditory signal;
            determining whether the encoded auditory signal has a residual that exceeds the residual threshold and the parameter variation threshold;
            determining whether the one or more parameters from the encoded auditory signal exceed the parameter variation threshold; and
            classifying the encoded auditory signal as the non-human generated undesirable auditory signal if the residual of the encoded auditory signal exceeds the residual threshold or classifying the encoded auditory signal as the human generated undesirable auditory signal if the one or more parameters from the encoded auditory signal do not exceed the parameter variation threshold;
      modifying the encoded auditory signal if the encoded auditory signal comprises an undesirable auditory signal, wherein modifying the encoded signal if the encoded signal comprises an undesirable auditory signal comprises at least one of:
         attenuating the undesirable auditory signal over a conference bridge; and
         dropping the undesirable auditory signal from the conference bridge; and
      combining the plurality of received signals.

2. The method of claim 1, wherein the one or more parameters comprises at least one of a vocal tract parameter and an excitation parameter.

3. The method of claim 1, wherein modifying the encoded signal if the encoded signal comprises an undesirable auditory signal further comprises:

establishing a time interval to monitor the encoded signal;
monitoring the encoded signal received during the time interval to determine if the encoded signal comprises an undesirable auditory signal that exceeds a predetermined time threshold; and
modifying the encoded signal if the undesirable auditory signal exceeds the predetermined time threshold.

4. Logic for classifying a plurality of signals, the logic embodied in a tangible medium and operable to:
receive a plurality of auditory signals from a plurality of communication devices, each signal received from a communication device;
repeat the following for each signal of the plurality of signals to yield one or more classified signals:
encode an auditory signal received from the communication device;
determine whether the encoded auditory signal comprises an undesirable auditory signal by:
collecting one or more parameters from the encoded auditory signal over a predetermined period of time for a plurality of periods of time; and
analyzing the one or more parameters over the predetermined periods of time to classify the encoded auditory signal as a selected one of a desirable auditory signal, a non-human generated undesirable auditory signal, and a human generated undesirable auditory signal, wherein analyzing the one or more parameters over the predetermined periods of time to classify the encoded auditory signal comprises:
establishing a residual threshold and a parameter variation threshold to analyze the encoded auditory signal;
determining whether the encoded auditory signal has a residual that exceeds the residual threshold and the parameter variation threshold;
determining whether the one or more parameters from the encoded auditory signal exceed the parameter variation threshold; and
classifying the encoded auditory signal as the non-human generated undesirable auditory signal if the residual of the encoded auditory signal exceeds the residual threshold or classifying the encoded auditory signal as the human generated undesirable auditory signal if the one or more parameters from the encoded auditory signal do not exceed the parameter variation threshold;
modify the encoded auditory signal if the encoded auditory signal comprises an undesirable auditory signal by performing at least one of:
attenuating the undesirable auditory signal over a conference bridge; and
dropping the undesirable auditory signal from the conference bridge; and
combine the plurality of received signals.

5. The logic of claim 4, operable to collect one or more parameters by collecting at least one of a vocal tract parameter and an excitation parameter.

6. The logic of claim 4, operable to modify the encoded signal if the encoded signal comprises an undesirable auditory signal by:
establishing a time interval to monitor the encoded signal;
monitoring the encoded signal received during the time interval to determine if the encoded signal comprises an undesirable auditory signal that exceeds a predetermined time threshold; and
modifying the encoded signal if the undesirable auditory signal exceeds the predetermined time threshold.

7. A system for classifying a plurality of signals, comprising:
a conference bridge coupled to a plurality of communication devices and operable to receive a plurality of auditory signals from the plurality of communication devices, each signal received from a communication device, the conference bridge comprising:
a signal classification module operable to:
repeat the following for each signal of the plurality of signals to yield one or more classified signals:
encode an auditory signal received from the communication device; and
determine whether the encoded auditory signal comprises an undesirable auditory signal by:
collecting one or more parameters from the encoded auditory signal over a predetermined period of time for a plurality of periods of time; and
analyzing the one or more parameters over the predetermined periods of time to classify the encoded auditory signal as a selected one of a desirable auditory signal, a non-human generated undesirable auditory signal, and a human generated undesirable auditory signal, wherein analyzing the one or more parameters over the predetermined periods of time to classify the encoded auditory signal comprises:
establishing a residual threshold and a parameter variation threshold to analyze the encoded auditory signal;
determining whether the encoded auditory signal has a residual that exceeds the residual threshold and the parameter variation threshold;
determining whether the one or more parameters from The encoded auditory signal exceed the parameter variation threshold; and
classifying the encoded auditory signal as the non-human generated undesirable auditory signal if the residual of the encoded auditory signal exceeds the residual threshold or classifying the encoded auditory signal as the human generated undesirable auditory signal if the one or more parameters from the encoded auditory signal do not exceed the parameter variation threshold;
a signal modification module coupled to the signal classification module and operable to modify the encoded auditory signal if the signal comprises an undesirable auditory signal by performing at least one of:
attenuating the undesirable auditory signal over a conference bridge; and
dropping the undesirable auditory signal from the conference bridge; and
a signal combiner coupled to the signal modification module and operable to combine the plurality of received signals; and
a processor coupled to the signal classification module, the signal modification module, and the signal combiner and operable to direct operation of the conference bridge.

8. The system of claim 7, the signal classification module further operable to encode a signal received from the communication device using a low bit rate speech model operable to model one or more parameters.

9. The system of claim 7, the conference bridge further operable to determine whether the signal comprises an undesirable auditory signal by:
- establishing a time interval to monitor the encoded signal;
- monitoring the encoded signal received during the time interval to determine if the encoded signal comprises an undesirable auditory signal that exceeds a predetermined time threshold; and
- modifying the encoded signal if the undesirable auditory signal exceeds the predetermined time threshold.

10. A system for classifying a plurality of signals, comprising:
- means for receiving a plurality of auditory signals from a plurality of communication devices, each signal received from a communication device;
- means for repeating the following for each signal of the plurality of signals to yield one or more classified signals:
  - encoding an auditory signal received from the communication device;
  - determining whether the encoded auditory signal comprises an undesirable auditory signal by:
    - collecting one or more parameters from the encoded auditory signal over a predetermined period of time for a plurality of periods of time; and
    - analyzing the one or more parameters over the predetermined periods of time to classify the encoded auditory signal, wherein analyzing the one or more parameters over the predetermined periods of time to classify the encoded auditory signal comprises:
      - establishing a residual threshold and a parameter variation threshold to analyze the encoded auditory signal;
      - determining whether the encoded auditory signal has a residual that exceeds the residual threshold and the parameter variation threshold;
      - determining whether the one or more parameters from the encoded auditory signal exceed the parameter variation threshold; and
      - classifying the encoded auditory signal as the non-human generated undesirable auditory signal if the residual of the encoded auditory signal exceeds the residual threshold or classifying the encoded auditory signal as the human generated undesirable auditory signal if the one or more parameters from the encoded auditory signal do not exceed the parameter variation threshold;
  - modifying the encoded auditory signal if the encoded auditory signal comprises an undesirable auditory signal by performing at least one of:
    - attenuating the undesirable auditory signal over a conference bridge; and
    - dropping the undesirable auditory signal from the conference bridge; and
- means for combining the plurality of received signals.

11. A method for classifying a plurality of signals, comprising:
- receiving a plurality of signals from a plurality of communication devices, each signal received from a communication device;
- repeating the following for each signal of the plurality of signals to yield one or more classified signals:
  - encoding a signal received from the communication device using a processor;
  - determining, using the processor, whether the encoded signal comprises an undesirable auditory signal by:
    - collecting one or more parameters from the encoded signal over a predetermined period of time for a plurality of periods of time;
    - analyzing the one or more parameters over the predetermined periods of time to classify the encoded signal by:
      - establishing a residual threshold to analyze the encoded signal, determining whether the encoded signal has a residual that exceeds the residual threshold, and classifying the encoded signal as a non-human generated undesirable auditory signal if the encoded signal has a residual that exceeds the residual threshold; and
      - establishing a parameter variation threshold to analyze the encoded signal, determining whether the one or more parameters from the encoded signal exceed the parameter variation threshold, and classifying the encoded signal as a human generated undesirable auditory signal if the one or more parameters from the encoded signal do not exceed the parameter variation threshold; and
  - modifying the encoded signal if the encoded signal comprises an undesirable auditory signal by:
    - establishing a time interval to monitor the encoded signal;
    - monitoring the encoded signal received during the time interval to determine if the encoded signal comprises an undesirable auditory signal that exceeds a predetermined time threshold; and
    - modifying the encoded signal if the undesirable auditory signal exceeds the predetermined time threshold, the encoded signal modified by performing at least one of:
      - attenuating the undesirable auditory signal over a conference bridge; and
      - dropping the undesirable auditory signal from the conference bridge; and
- combining the plurality of received signals.

* * * * *